United States Patent
Lundy et al.

(10) Patent No.: US 12,043,178 B2
(45) Date of Patent: Jul. 23, 2024

(54) MOTOR CONNECTION

(71) Applicant: GENTEX CORPORATION, Zeeland, MI (US)

(72) Inventors: Eric S. Lundy, Holland, MI (US); Gregory J. Nagel, Byron Center, MI (US); Richard B. Kollewehr, West Olive, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

(21) Appl. No.: 17/730,362

(22) Filed: Apr. 27, 2022

(65) Prior Publication Data

US 2022/0340081 A1    Oct. 27, 2022

Related U.S. Application Data

(60) Provisional application No. 63/180,263, filed on Apr. 27, 2021.

(51) Int. Cl.
  *B60R 1/12*   (2006.01)
  *B60Q 1/26*   (2006.01)
  (Continued)

(52) U.S. Cl.
  CPC ............. *B60R 1/12* (2013.01); *B60Q 1/2665* (2013.01); *B60K 35/00* (2013.01); *B60K 35/22* (2024.01);
  (Continued)

(58) Field of Classification Search
  CPC .. B60R 1/00; B60R 1/04; B60R 1/072; B60R 1/087; B60R 1/12; B60K 35/00;
  (Continued)

(56) References Cited

U.S. PATENT DOCUMENTS

| 5,064,274 A | * | 11/1991 | Alten | B60R 1/087 359/872 |
| 6,229,226 B1 | * | 5/2001 | Kramer | B60R 1/072 307/10.1 |

(Continued)

FOREIGN PATENT DOCUMENTS

| JP | 0745062 U | 12/1995 |
| KR | 1020080031105 A | 4/2008 |

OTHER PUBLICATIONS

NPL search (Jun. 1, 2023).*
(Continued)

*Primary Examiner* — Van T Trieu
(74) *Attorney, Agent, or Firm* — Price Heneveld LLP; Brian James Brewer

(57) ABSTRACT

A system for securing a motor to a circuit board of a rearview assembly may comprise a display element having an orientation; a motor having at least two motor terminals; a motherboard having a connection header; and a motor connection printed circuit board defining at least two slots and having a body portion and an end portion. Traces may extend from the at least two slots to the end portion of the motor connection printed circuit board. Each of the at least two motor terminals may be inserted into one of the at least two slots defined by the motor connection printed circuit board; and a portion of each of the at least two motor terminals may extend through the slot in which it has been inserted.

17 Claims, 6 Drawing Sheets

(51) Int. Cl.
  *B60K 35/00*   (2006.01)
  *B60K 35/22*   (2024.01)
  *B60R 1/04*    (2006.01)

(52) U.S. Cl.
  CPC ............ *B60K 2360/42* (2024.01); *B60R 1/04* (2013.01); *B60R 2001/1215* (2013.01)

(58) Field of Classification Search
  CPC .......... H01H 15/22; H02K 5/225; H02K 5/24; H02K 11/026; H02K 11/028; G02B 7/198; G02B 17/00
  See application file for complete search history.

(56) References Cited

U.S. PATENT DOCUMENTS

| | | | |
|---|---|---|---|
| 2009/0190243 A1* | 7/2009 | Fukai | B60R 1/072 359/877 |
| 2017/0193969 A1 | 7/2017 | Kimura | |
| 2018/0029534 A1 | 2/2018 | De Wind et al. | |
| 2018/0342932 A1* | 11/2018 | Wachter | H02K 11/33 |
| 2019/0256000 A1 | 8/2019 | Little et al. | |
| 2020/0377022 A1* | 12/2020 | LaCross | B60R 1/12 |

OTHER PUBLICATIONS

International Search Report dated Aug. 4, 2022, for corresponding PCT application No. PCT/US2022/026436, 3 pages.
Written Opinion dated Aug. 4, 2022, for corresponding PCT application No. PCT/US2022/026436, 6 pages.

* cited by examiner

MOTOR CONNECTION

CROSS REFERENCE TO RELATED APPLICATIONS

This application claims the benefit of and priority to U.S. Provisional Patent Application No. 63/180,263, filed on Apr. 27, 2021, entitled "Motor Connection," the entire disclosure of which is hereby incorporated herein by reference.

FIELD OF THE DISCLOSURE

This disclosure relates generally to rearview assemblies, and in particular, to securing motors to circuit boards in rearview assemblies.

BACKGROUND

Many rearview assemblies for vehicles may require motors to operate some of the functions, such as moving a display element. Motors are generally connected to circuit boards. However, motor terminals may not be conducive to being connected to circuit boards during a mass production process. The connection between the motor and the circuit board may be achieved through wires soldered to motor terminals. In the case of brushed motors, ferrite beads ("ferrites") may need to be added to the wires to reduce noise from the motors. A wire harness may secure at least a portion of the wires together, and the wire harness may be plugged into the circuit board. The ferrites may be bulky on the wires and, unless secured to the wires, may move around on the wires. Therefore, it may be difficult to maneuver the wires and ferrites into the proper placement prior to securing components in place. This may preclude or make difficult the use of automation to perform the attachment steps related to securing motors to circuit boards.

SUMMARY

A system for securing a motor to a circuit board of a rearview assembly may comprise a display element having an orientation; a motor having at least two motor terminals; a motherboard having a connection header; a motor connection printed circuit board having a body portion and an end portion and a plurality of traces. The body portion of the motor connection printed circuit board may define at least two slots. Each of the plurality of the traces may extend from one of the at least two slots to the end portion of the motor connection printed circuit board. Each of the at least two motor terminals may be inserted into one of the at least two slots defined by the motor connection printed circuit board; and a portion of each of the at least two motor terminals may extend through the slot in which it has been inserted.

The system further may comprise at least one ferrite secured to the motor connection printed circuit board. The system further may comprise at least one capacitor secured to the motor connection printed circuit board. The system further may comprise a user interface configured to receive inputs from a user and to provide inputs to the motherboard; and the inputs may be configured to control the motor. A particular input to the user interface may cause the motor to change the orientation of the display element.

The rearview assembly may be capable of operating either in a mirror mode or in a display mode. The rearview assembly may be capable of switching between the mirror mode and the display mode upon receipt of an appropriate input to a user interface. The connection header of the motherboard may be configured to accept the end portion of the motor connection printed circuit board. The connection header of the motherboard may be an edge connection header. The traces may terminate in connectors in the end portion of the motor connection printed circuit board. The connection header may comprise connectors; and the connectors in the end portion of the motor connection printed circuit board may contact the connectors in the connection header when motor connection printed circuit board is inserted into the connection header.

A method of securing a motor to a circuit board may comprise inserting motor terminals into slots defined in motor connection printed circuit board; securing at least one motor terminal to a motor connection printed circuit board; and inserting an end portion of the motor connection printed circuit board into a connection header on a motherboard. The connection header and the end portion of the motor connection printed circuit board may both comprise connectors; and when the end portion of the motor connection printed circuit board is inserted into the connection header, the connectors of the motor connection printed circuit board may be in contact with the connectors of the connection header.

The method further may comprise securing at least one ferrite to the motor connection printed circuit board and wherein the at least one ferrite may be disposed to be in proximity to the motor when the at least one motor terminal has been inserted into slots. Each of the at least one ferrites may be secured to a body portion of the motor connection printed circuit board. The method further may comprise securing at least one capacitor to motor connection printed circuit board. The connection header may be an edge connection header. Traces may extend from the slots defined in motor connection printed circuit board to the connectors in the end portion of the motor connection printed circuit board.

DETAILED DESCRIPTION

Figure 1:
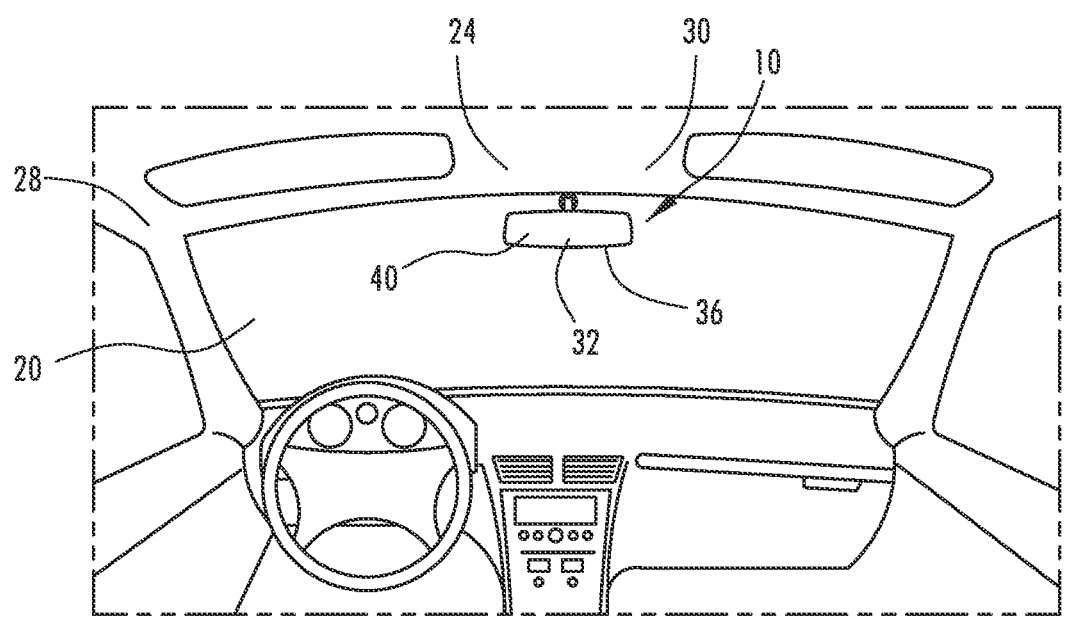
FIG. 1 illustrates a rearview assembly disposed in a vehicle in accordance with this disclosure.

Referring to FIG. 1, a rearview assembly is shown generally at 10. Rearview assembly 10 may be configured to be secured to a windshield 20 and/or a roof 24 of a vehicle 28 and to provide a view of a scene to the rear of vehicle 28. Rearview assembly 10 may have a display mode in which an imager (not shown) captures a scene to the rear of vehicle 28 and the captured scene is displayed on a display element 32 of rearview assembly 10. In addition, rearview assembly 10 may have a mirror mode, in which a scene is reflected in display element 32 of rearview assembly 10.

Figure 2:
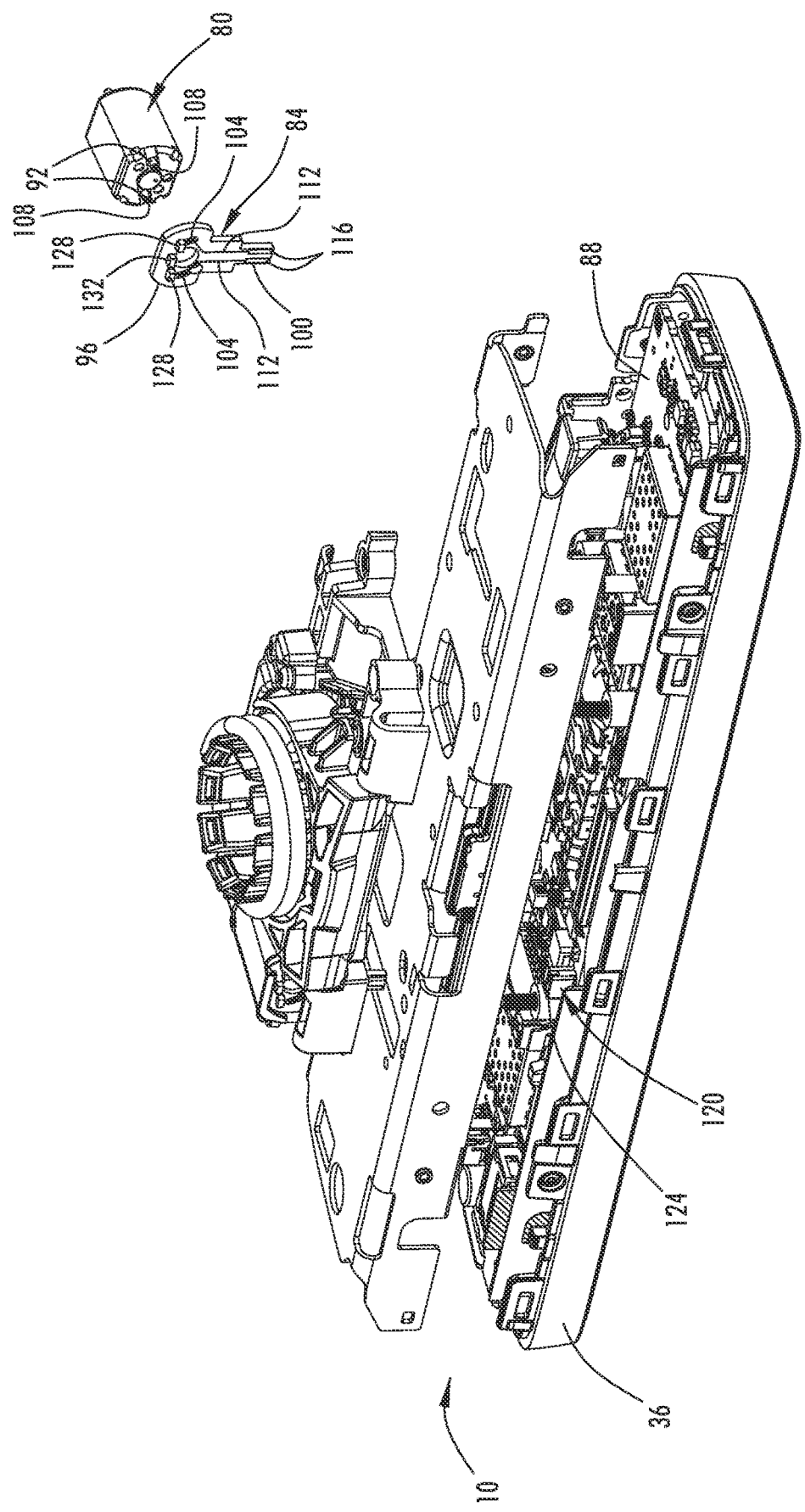
FIG. 2 illustrates a partially exploded view of the rearview assembly of FIG. 1, showing a motor and a motor connection printed circuit board.
Figure 4:
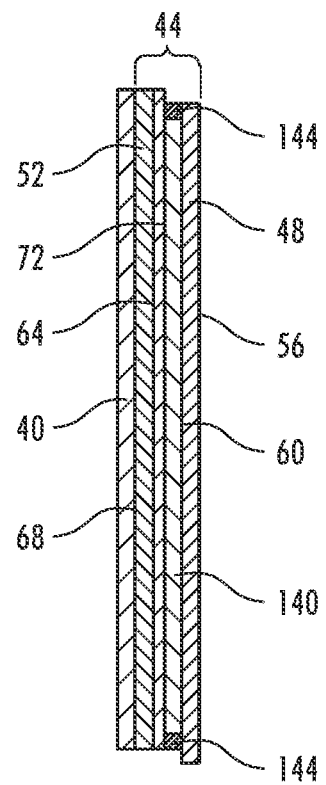
FIG. 4 illustrates a side cross-sectional view of an electro-optic element and display substrate of the exterior rearview assembly of FIG. 3 along line IV-IV in accordance with this disclosure.

As shown in FIG. 2, rearview assembly 10 may include a housing 36 that may be configured to support and protect display element 32. Display element 32 may comprise a display substrate 40, as shown in FIG. 4.

Figure 3:
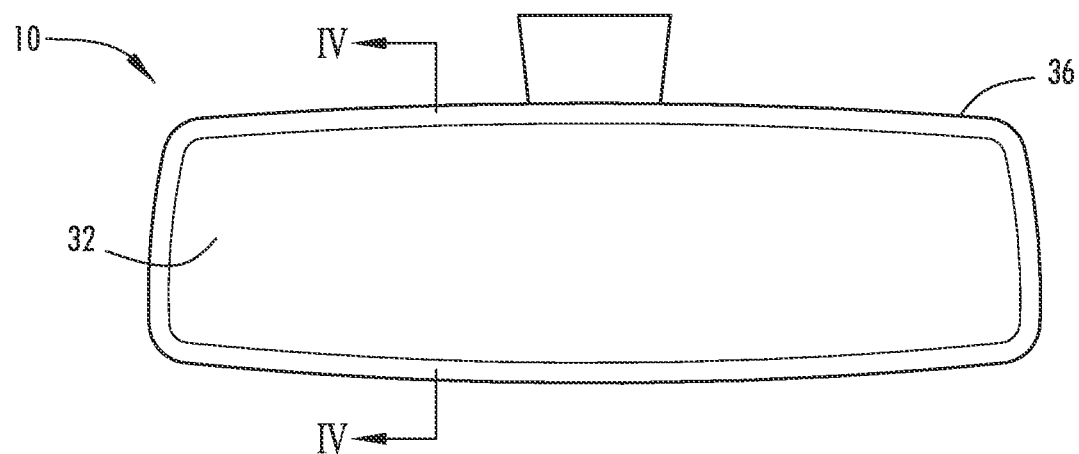
FIG. 3 illustrates a front view of the rearview assembly of FIG. 1.

The imager may be located in or on vehicle 28 or rearview assembly 10 and may capture image data. In some embodiments, the imager may be configured to capture image data from scenes exterior to and to the rear of vehicle 28. The captured image data may be processed by a processor (not shown) and the images from the captured image data may be displayed on display substrate 40 of rearview assembly 10, as shown in FIGS. 3 and 4.

Display element 32 may additionally comprise an at least partially reflective, partially transmissive element capable of selective darkening and clearing, such as an electro-optic element 44. With continued reference to FIG. 4, electro-optic element 44 may include first and second substrates 48, 52, respectively. First substrate 48 may define a first surface 56 and a second surface 60 and second substrate 52 may define a third surface 64 and a fourth surface 68. A reflective coating 72 may be disposed on one of third surface 64 and fourth surface 68, thereby creating a reflective surface. Reflective coating 72 may be configured to, when rearview assembly 10 is positioned appropriately, provide a reflection of the area behind vehicle 28 to a driver.

When rearview assembly 10 is in the display mode, the presence of reflective coating 72 on third or fourth surface 64, 68 of second substrate 52 can cause the image reflected by reflective surface to compete with an image presented on display substrate 40. To alleviate such image competition, display substrate 40 can be angled up to avoid capturing reflected images from a rearview window of vehicle 28. In some embodiments, display substrate may be moved such that the reflective surface reflects an image of the vehicle headliner 30 toward the driver. Because vehicle headliners 30 are of generally consistent, non-reflective material, such an image may compete less with the images being displayed on display substrate 40. Accordingly, rearview assembly 10 may be configured to provide for automatic repositioning of display substrate 40 between an appropriate position thereof for use of reflective surface when display substrate 40 is in the mirror mode and for viewing of a displayed image, without undesirable competition, when rearview assembly 10 is in the display mode.

Figure 5:
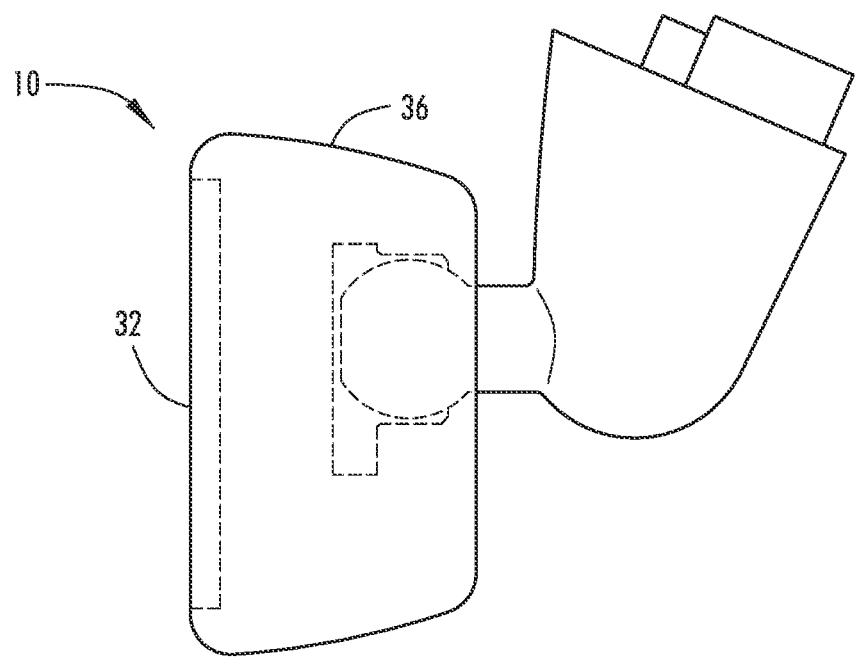
FIG. 5 illustrates a side view of the rearview assembly in a first position.
Figure 6:
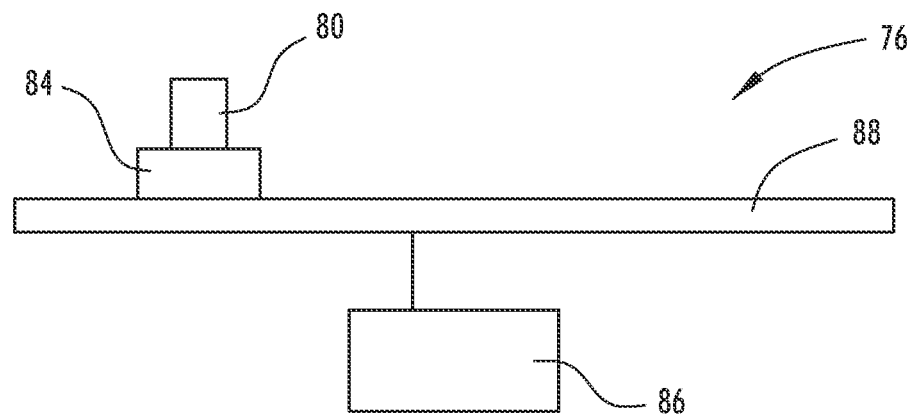
FIG. 6 illustrates a block diagram of a display orientation system in accordance with this disclosure.

As shown in FIG. 5, when display element 32 is in the mirror mode, rearview assembly 10 may be configured such that display element 32 is in a first position, Referring now to FIG. 6, rearview assembly 10 may include a display orientation system, generally indicated at 76, for changing the orientation of display element 32. Display orientation system 76 may be used in a rearview assembly 10 as described in U.S. Pat. No. 10,696,230, granted on Jun. 30, 2020, entitled, AUTO TILT CLUTCH MECHANISM, the entire disclosure of which is incorporated herein by reference. Display orientation system 76 may comprise a motor 80, a motor connection printed circuit board 84, hereinafter referred to as MC PCB, a user interface 86, and a motherboard 88. Motherboard 88 may be disposed within housing 36 and may comprise components to control and to activate and deactivate various features of rearview assembly 10.

Motor 80 may have two or more motor terminals 92 extending from motor 80. In some embodiments, motor 80 may have a generally planar face and the two or more motor terminals 92 may extend from the generally planar face.

Figure 7:
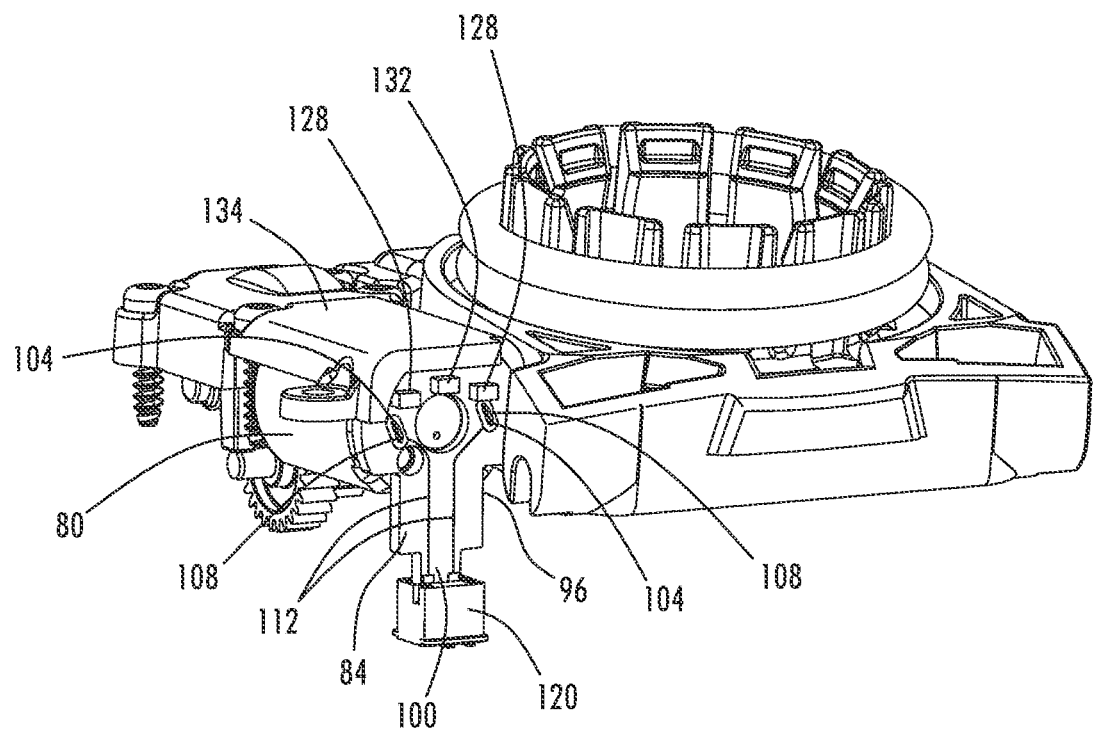
FIG. 7 illustrates a perspective view of the motor and motor connection printed circuit board of FIG. 1.

MC PCB 84 may have a body portion 96 and an end portion 100. Body portion 96 of MC PCB 84 may define at least two slots 104. Each of the slots 104 may be configured to accept one of the motor terminals 92. When motor terminals 92 are inserted into the slots 104, each motor terminal 92 may have a portion 108 that extends through the associated slot 104, as shown in FIG. 7. Motor terminals 92 and/or the portions 108 of the motor terminals 92 that extend beyond the face of MC PCB 84 may be soldered or otherwise secured to MC PCB 84, thereby securing motor 80 to MC PCB 84.

MC PCB 84 may further comprise traces 112 extending from each of the at least two slots 104. Each of the traces 112 may extend from one of the slots 104 and may terminate in a connector 116 disposed in end portion 100 of MC PCB 84. Motherboard 88 may have a connection header 120 that defines an opening 124. The opening 124 may be capable of receiving end portion 100 of MC PCB 84. Two or more mating connectors (not shown) may be disposed in connection header 120 and may be configured to be in electrical communication with motherboard 88 thereby allowing motor 80 to be electrically connected to motherboard 88 when end portion 100 of MC PCB 84 is inserted into connection header 120. Each connector 116 may be configured to, when MC PCB 84 is installed in connection header 120 on motherboard 88, contact the mating connectors of connection header 120, thereby electrically connecting motor 80 to motherboard 88.

In some embodiments, connection header 120 on motherboard 88 may comprise an edge connection header. Accordingly, MC PCB 84 may be blindly inserted into connection header 120 of motherboard 88 and secured into place, thereby making the attachment of motor 80 to mother board easier, faster, and more accurate. Attaching motor 80 to motherboard 88 in this way may also allow the machine assembly of motor 80 to motherboard 88 rather than being manually assembled.

MC PCB 84 may further comprise at least one ferrite 128. The at least one ferrite 128 may be secured to body portion 96 of MC PCB 84. The at least one ferrite 128 may be used to suppress electromagnetic interference from motor 80, thereby reducing the associated electrical noise. Securing the at least one ferrite 128 to MC PCB 84 may allow the at least one ferrite 128 to be positioned in close proximity to motor terminals 92. In some embodiments, one or more capacitors 132 may be used in addition to or instead of the at least one ferrite 128.

A shroud 134 may be configured to hold motor 80 in place when rearview assembly 10 is assembled. Shroud 134 may be configured to cover a portion of motor 80. Housing 36 may comprise two portions that may be fastened together, and shroud 134 may be configured to be a portion of one of the housing portions.

In some embodiments, motor 80 may be configured to cause the orientation of display element 32 in rearview assembly 10 to change when going from mirror mode to display mode and/or vice versa. Motor 80 may be mounted on and in electrical communication with motherboard 88. Motor 80 may be configured to be activated in response to an input on user interface 86. User interface 86 may comprise a button, switch, lever, knob, and the like. User interface 86 may be located on housing 36 of rearview assembly 10 or in a location remote from rearview assembly 10, such as on a steering wheel, a dashboard, an infotainment console, etc.

Figure 8:
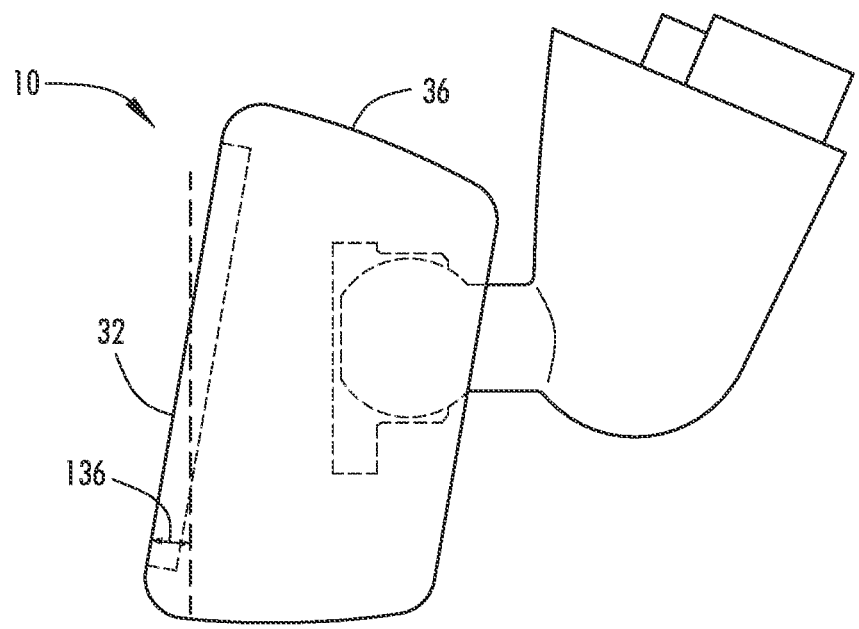
FIG. 8 illustrates a side view of the rearview assembly in a second position.

Motor 80 may be configured to, upon activation, cause the rotation of display element 32, thereby changing the orientation of display element 32. The orientation of display element 32 may be changed when rearview assembly 10 is changed from mirror mode to display mode or from display mode to mirror mode. Upon the receipt of a first particular input via user interface 86, such as an input on user interface 86 putting rearview assembly 10 into display mode from mirror mode, motor 80 may cause display element 32 to tilt upward toward vehicle headliner 30 at a predetermined angle 136, thereby orienting reflective surface toward headliner 30, as shown in FIG. 8. Accordingly, when rearview assembly 10 is in display mode, display element 32 may be angled so that reflective surface captures most reflections from the vehicle headliner 30 rather than from the interior of the vehicle cabin. This may reduce or eliminate unwanted reflections on rearview assembly 10, such as "ghost" reflections of the interior of the vehicle 28 on one of the surfaces of display element 32, when the rearview assembly 10 is in a display mode. Upon the receipt of a second particular input at user interface 86, such as putting rearview assembly 10 into mirror mode, motor 80 may cause the actuation mechanism to return display element 32 to the previous orientation, as shown in FIG. 5.

First and second substrates 48, 52 of electro-optic element 44 may be made of glass, a polymeric material, or any other material known in the art. An electro-optic medium 140 may be disposed between first substrate 48 and second substrate 52. A seal 144 may extend between first substrate 48 and second substrate 52. Electro-optic medium 140 may be sealed between seal 144 and first and second substrates 48, 52.

Display substrate 40 may comprise one or more pixels or arrays of lighting elements configured to be selectively illuminated to emit display data as visible light. Examples of such display technologies may include, but are not limited to, liquid crystal displays (LCDs), which may be backlit or edge lit, organic light-emitting diode (OLED) displays, or other related display technologies.

The orientation of rearview assembly 10 can be adjusted by a user for user of reflective surface when display element 32 is in the mirror mode by, for example, manipulation of the housing 36 of rearview assembly 10, which may be affixed to display element 32.

Figure 9:
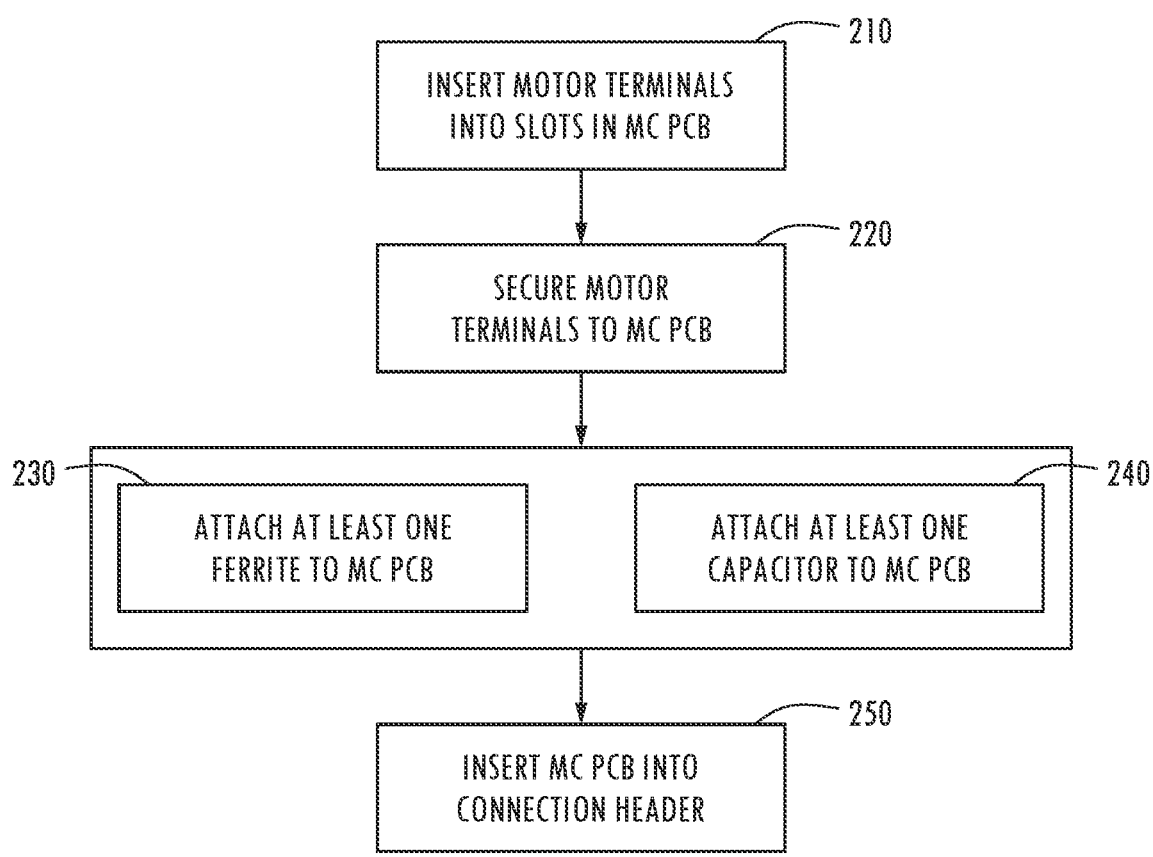
FIG. 9 illustrates a flow chart of the steps of a method of securing the motor to a motherboard of the rearview assembly.

A method of securing motor 80 to mother board, shown generally at 200 in FIG. 9, may comprise, at step 210, inserting motor terminals 92 into slots 104 defined by MC PCB 84. In step 220, motor terminals 92 may be secured to MC PCB 84. This may be done by soldering, shrink fit, press fit, or other methods known in the art. In step 230, at least one ferrite 128 may be attached to MC PCB 84. The at least one ferrite 128 may be secured to body portion 96 of MC PCB 84 and may be disposed to be in proximity to motor 80 when motor terminals 92 have been inserted into slots 104. In step 240, one or more capacitors 132 may be secured to MC PCB 84. The one or more capacitors 132 may be secured to body portion 96 of MC PCB 84 and may be in proximity to motor 80 when motor terminals 92 have been inserted into slots 104. In step 250, end portion 100 of MC PCB 84 may be inserted into edge connection header 120 on motherboard 88. Traces 112 in MC PCB 84 may extend from slots 104 and end in connectors 116 in end portion 100 of MC PCB 84. Connectors 116 may, upon insertion of MC PCB 84 into edge connection header 120, contact connectors disposed within edge connection header 120 that are, in turn, electrically connected to motherboard 88, thereby electrically connecting motor 80 to motherboard 88. In some embodiments, the at least one ferrite 128 may be attached to MC PCB 84 and the one or more capacitors may be secured to MC PCB 84 prior to inserting motor terminals 92 into slots 104 defined by MC PCB 84.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise. It is further to be understood that the steps within any described processes may be performed in any order and still be within the intended scope of the present innovations and are not intended to be limited to the order in which they are described.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. A system for securing a motor to a circuit board of a rearview assembly, comprising:
   a display element having an orientation;
   a motor having at least two motor terminals;
   a motherboard having a connection header;
   a motor connection printed circuit board having a body portion and an end portion, wherein the body portion defines at least two slots, the motor connection printed circuit board further including a plurality of conductive traces thereon and extending from respective ones of the at least two slots to the end portion, respective ones of the motor terminals being received in respective ones of the slots and being electrically connected with respective ones of the conductive traces such that the motor connection printed circuit board defines an electrical connection between the motherboard and the motor; and
   at least one ferrite secured to the body portion of the motor connection printed circuit board in proximity to the motor.

2. The system of claim 1, wherein a portion of each of the at least two motor terminals extends through the slot in which it has been inserted.

3. The system of claim 1, further comprising at least one capacitor secured to the motor connection printed circuit board.

4. The system of claim 1, further comprising a user interface configured to receive inputs from a user and to provide inputs to the motherboard;
   wherein the inputs are configured to control the motor.

5. The system of claim 4, wherein a particular input to the user interface causes the motor to change the orientation of the display element.

6. The system of claim 1, wherein the rearview assembly is capable of operating in either a mirror mode or in a display mode.

7. The system of claim 6, wherein the rearview assembly is capable of switching between the mirror mode and the display mode upon receipt of an appropriate input to a user interface.

8. The system of claim 1, wherein the connection header of the motherboard is configured to accept the end portion of the motor connection printed circuit board.

9. The system of claim 1, wherein the connection header of the motherboard is an edge connection header.

10. The system of claim 1, wherein the traces terminate in connectors in the end portion of the motor connection printed circuit board.

11. The system of claim 10, wherein the connection header comprises connectors; and
    wherein the connectors in the end portion of the motor connection printed circuit board contact the connectors in the connection header when motor connection printed circuit board is inserted in connection header.

12. A method of electrically connecting a motor to a circuit board, comprising:
    inserting motor terminals of the motor into slots defined in a motor connection printed circuit board within a body portion thereof;
    securing at least one motor terminal to the motor connection printed circuit board to electrically connect the at least one motor terminal to at least one conductive trace extending from the at least one slot to an end portion of the motor connection printed circuit board; and
    inserting the end portion of the motor connection printed circuit board into a connection header on a motherboard to electrically connect the at least one motor terminal with the motherboard by way of the at least one conductive trace; and
    securing at least one ferrite to the motor connection printed circuit board so as to be disposed to be in proximity to the motor when the at least one motor terminal has been inserted into the at least one slot.

13. The method of claim 12, wherein each of the at least one ferrite is secured to the body portion of the motor connection printed circuit board.

14. The method of claim 12, further comprising securing at least one capacitor to motor connection printed circuit board.

15. The method of claim 12, wherein the connection header is an edge connection header.

16. The system of claim 1, wherein the at least two motor terminals are secured with the respective ones of the at least two slots by respective solder connections.

17. The method of claim 12, securing the at least one motor terminal to the motor connection printed circuit board includes applying solder to the respective motor terminals and slots.

\* \* \* \* \*